United States Patent
Bulan et al.

(10) Patent No.: US 6,673,329 B2
(45) Date of Patent: Jan. 6, 2004

(54) PROCESS FOR PREPARING FLUOROSULFONIC ACID HAVING LOW CONTENTS OF LOW-BOILING COMPOUNDS

(75) Inventors: Andreas Bulan, Langenfeld (DE); Michael Batz, Leichlingen (DE); Dieter Heinz, Leverkusen (DE); Kasper Hallenberger, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 339 days.

(21) Appl. No.: 09/885,983

(22) Filed: Jun. 20, 2001

(65) Prior Publication Data

US 2002/0001562 A1 Jan. 3, 2002

(30) Foreign Application Priority Data

Jun. 30, 2000 (DE) .......................... 100 31 830

(51) Int. Cl.$^7$ ............................................. C01B 17/145
(52) U.S. Cl. ....................................... 423/467; 423/468
(58) Field of Search ................................. 423/467, 468

(56) References Cited

U.S. PATENT DOCUMENTS

| | | | | |
|---|---|---|---|---|
| 2,430,963 A | * | 11/1947 | Stephenson et al. | ........ 423/467 |
| 3,957,959 A | | 5/1976 | Wheatley et al. | ........... 423/467 |
| 4,033,899 A | * | 7/1977 | Bennett et al. | ................ 502/22 |

FOREIGN PATENT DOCUMENTS

| | | |
|---|---|---|
| JP | 50-39693 | 4/1975 |
| JP | 51-76193 | 7/1976 |
| JP | 55-126509 | 9/1980 |
| SU | 632 646 | 11/1978 |

* cited by examiner

Primary Examiner—Stanley S. Silverman
Assistant Examiner—Edward M. Johnson
(74) Attorney, Agent, or Firm—Godfried R. Akorli; Diderico van Eyl

(57) ABSTRACT

The invention relates to a novel process for preparing fluorosulfonic acid having low contents of low-boiling compounds in which hydrogen fluoride and sulfur trioxide are combined in stoichiometric amounts in a reaction vessel or by means of a reaction nozzle, the hot, gaseous fluorosulfonic acid that is formed is fed directly into a distillation column, and the fluorosulfonic acid is taken off at the bottom of the column or in the stripping section of the distillation column.

7 Claims, No Drawings

PROCESS FOR PREPARING FLUOROSULFONIC ACID HAVING LOW CONTENTS OF LOW-BOILING COMPOUNDS

BACKGROUND OF THE INVENTION

The invention relates to a novel process for preparing fluorosulfonic acid.

Many methods of preparing fluorosulfonic acid, starting from sulfur trioxide and hydrogen fluoride, are already known from the prior art.

According to JP-A 55-126,509, gaseous hydrogen fluoride is passed into fluorosulfonic acid containing sulfur trioxide until the molar ratio of sulfur trioxide to hydrogen fluoride is one.

U.S. Pat. No. 3,957,959 describes a process in which fluorosulfonic acid is prepared by introducing liquid sulfur trioxide and liquid hydrogen fluoride into fluorosulfonic acid. The reaction stream is cooled.

According to JP-A 50-39,693, fluorosulfonic acid can be prepared from oleum (60% strength) and hydrogen fluoride at 60° C. in a stirred vessel. After the reaction has been carried out, the mixture is distilled to give fluorosulfonic acid as product taken off at the top.

Other processes start from chlorosulfonic acid. Thus, according to SU 632,646, chlorosulfonic acid is reacted at from 10 to 30° C. with gaseous hydrogen fluoride to form fluorosulfonic acid.

All these known processes give fluorosulfonic acid that still contains considerable amounts of low-boiling compounds.

The contents of low-boiling compounds in the fluorosulfonic acid, e.g., hydrogen chloride, chlorine, and silicon tetrafluoride, can be lowered, for example, as described in JP 51-76,193 by stripping with inert gas.

A disadvantage of stripping fluorosulfonic acid with inert gas is the difficulty of treating the waste gas. Thus, small amounts of volatile compounds such as sulfur dioxide must be removed from a very large volume flow of inert gas. A further disadvantage of stripping with inert gas is the relatively high loss of fluorosulfonic acid, which can be attributed to discharge with the inert gas stream.

Carrying out the preparation of fluorosulfonic acid in a solvent, e.g., fluorosulfonic acid, is also disadvantageous. The heat of reaction of the strongly exothermic reaction between hydrogen fluoride and sulfur trioxide is not then available at a high temperature level. The preparation of fluorosulfonic acid from chlorosulfonic acid has the disadvantage that chlorosulfonic acid must be prepared first. In addition, the purification of the fluorosulfonic acid prepared in this process is made more complicated by the need to remove residues of chlorosulfonic acid or hydrogen chloride. In addition, the reaction of chlorosulfonic acid with hydrogen fluoride produces hydrogen chloride that is contaminated with hydrogen fluoride and must be additionally purified.

It is therefore an object of the present invention to provide an economical, industrially usable process for preparing fluorosulfonic acid having low contents of low-boiling compounds.

SUMMARY OF THE INVENTION

The present invention provides a process for preparing fluorosulfonic acid comprising (a) combining hydrogen fluoride and sulfur trioxide in stoichiometric amounts in a reaction vessel or by means of a reaction nozzle to form hot, gaseous fluorosulfonic acid, (b) feeding the hot, gaseous fluorosulfonic acid directly into a distillation column, and (c) taking off the fluorosulfonic acid at the bottom of the column or in the stripping section of the distillation column.

DETAILED DESCRIPTION OF THE INVENTION

The fluorosulfonic acid prepared by the process of the invention has only a low content of low-boiling compounds. For example, the sulfur dioxide content is less than 0.1% by weight.

In the process of the invention, stoichiometric amounts of hydrogen fluoride and sulfur trioxide are mixed in a reaction vessel (e.g., a reactor) or by means of a reaction nozzle. The starting materials hydrogen fluoride and sulfur trioxide can be introduced in either liquid or gaseous form.

The fluorosulfonic acid that is formed is generally at a temperature of from 200 to 300° C. These fluorosulfonic acid vapors are fed into the middle part of a distillation column. As a column, it is in principle possible to employ any distillation column that can be used in the prior art. The column can contain customary random packing elements (e.g., made of glass or Teflon) or structured packing.

The condensation of the gaseous fluorosulfonic acid vapors at the top of the column can be carried out, for example, using a condenser. The condensation of the gaseous fluorosulfonic acid vapors at the top of the column is preferably achieved by introduction of liquid, cold fluorosulfonic acid. In this case, it is possible to dispense with the use of a condenser. The liquid, cold fluorosulfonic acid can be fed either to the top of the column or into the middle part of the column. The liquid, cold fluorosulfonic acid is advantageously atomized when fed into the column. The amount of liquid, cold fluorosulfonic acid introduced is such a way that no fluorosulfonic acid vapors, or only small amounts of such vapors, leave the column by the top. As an alternative, a condenser can be installed at the top of the column. The condenser can advantageously be operated using fluorosulfonic acid as coolant.

The stripping section of the column can be heated. The wall temperature of the stripping section can be either below or above the boiling point of the fluorosulfonic acid. The wall temperature advantageously corresponds to the boiling point of the fluorosulfonic acid in the column.

Depending on the impurity contents of the fluorosulfonic acid and the desired purity, the fluorosulfonic acid leaving the stripping section can be vaporized again. However, the stripping section of the column is advantageously designed so that revaporization at the bottom of the column is not necessary.

The pressure in the column can be from 0.05 to 1.5 bar, advantageously from 0.4 to 1.1 bar.

The process of the invention gives fluorosulfonic acid having a total content of low-boiling compounds of less than 0.1% by weight. For the purposes of the present invention, low-boiling compounds are sulfur dioxide, sulfur trioxide, hydrogen fluoride, arsenic trifluoride, phosphorus fluorides, and silicon tetrafluoride. The fluorosulfonic acid prepared by the process of the invention preferably has a sulfur dioxide content of less than 0.07% by weight.

EXAMPLES

Example 1

Stripping of Fluorosulfonic Acid Using Nitrogen (Prior Art)

The removal of sulfur dioxide was carried out by stripping with inert gas. For this purpose, a stripping column was supplied with 2000 g/h of fluorosulfonic acid. The sulfur dioxide concentration of the fluorosulfonic acid fed in was 0.87% by weight (amount of sulfur dioxide 17.4 g/h), and the temperature of the fluorosulfonic acid fed in was 140° C. Column data: diameter was 2 cm, height of the packing bed was 30 cm, and packing elements were Raschig rings 4*4 mm. A nitrogen stream of 12 l/h was introduced in countercurrent to the fluorosulfonic acid fed in. The fluorosulfonic acid flowing out had a sulfur dioxide concentration of 0.3% by weight (amount of sulfur dioxide: 5.7 g/h). 67% of the sulfur dioxide was removed. A loss of fluorosulfonic acid of 5% was observed.

Example 2

Process of the Invention 810 g/h of gaseous fluorosulfonic acid having a temperature of 200° C. and a sulfur dioxide content of 0.37% by weight (amount of sulfur dioxide 2.99 g/h) were fed into the middle part of a column. Column data: (1) absorption section: diameter was 1 cm, height of the packing bed was 21 cm, and packing elements were Raschig rings 4*4 mm; (2) stripping section: diameter was 4 cm, height of the packing bed was 1 cm, and packing elements were Raschig rings 4*4 mm. The wall temperature of the column was about 150° C. and was maintained by electric heating. At the top of the column, 460 g/h of liquid fluorosulfonic acid having a temperature of 20° C. were introduced. The sulfur dioxide content of the fluorosulfonic acid flowing out was 0.07% by weight (amount of sulfur dioxide 0.89 g/h). 70% of the sulfur dioxide were removed. No loss of fluorosulfonic acid was observed.

What is claimed is:

1. A process for preparing fluorosulfonic acid comprising
   (a) combining hydrogen fluoride and sulfur trioxide in stoichiometric amounts in a reaction vessel or by means of a reaction nozzle to form hot, gaseous fluorosulfonic acid,
   (b) feeding the hot, gaseous fluorosulfonic acid directly into a distillation column, and
   (c) taking off the fluorosulfonic acid at the bottom of the column or in the stripping section of the distillation column.

2. A process according to claim 1 wherein the column has an absorption section and a stripping section.

3. A process according to claim 1 wherein the stripping section is heated.

4. A process according to claim 1 wherein the wall temperature of the stripping section corresponds to the boiling point of the fluorosulfonic acid in the column.

5. A process according to claim 1 wherein the gaseous fluorosulfonic acid is condensed at the top of the column by introduction of liquid, cold fluorosulfonic acid.

6. A process according to claim 1 wherein the pressure in the column is from 0.05 to 1.2 bar.

7. A process according to claim 1 wherein the fluorosulfonic acid taken off at the bottom of the column has a content of low-boiling compounds of less than 0.1% by weight.

* * * * *